United States Patent [19]

Biolchini et al.

[11] Patent Number: 4,687,648

[45] Date of Patent: Aug. 18, 1987

[54] SODIUM-LIMESTONE DOUBLE ALKALI FLUE GAS DESULFURIZATION PROCESS WITH IMPROVED LIMESTONE UTILIZATION

[75] Inventors: Robert J. Biolchini, Algonquin; Willard L. Boward, Jr., Hoffman Estates; Kuei-Hsiung Wang, Arlington Heights, all of Ill.

[73] Assignee: FMC Corporation, Philadelphia, Pa.

[21] Appl. No.: 877,820

[22] Filed: Jun. 24, 1986

[51] Int. Cl.$^4$ ............................................. C01B 17/00
[52] U.S. Cl. ................................. 423/242; 423/512 A
[58] Field of Search .......... 423/242 A, 242 R, 244 A, 423/244 R, 512 A

[56] References Cited

U.S. PATENT DOCUMENTS

| | | | |
|---|---|---|---|
| 3,848,070 | 11/1974 | Onozuka et al. | 423/242 |
| 3,944,649 | 3/1976 | Field et al. | 423/242 |
| 3,989,796 | 11/1976 | Morita et al. | 423/242 |
| 4,261,962 | 4/1981 | Dauerman et al. | 423/242 |
| 4,313,924 | 2/1982 | Pike | 423/242 |
| 4,331,640 | 5/1982 | Morita et al. | 423/242 |
| 4,388,282 | 6/1983 | Chou et al. | 423/242 |
| 4,410,500 | 10/1983 | Wang et al. | 423/242 |
| 4,431,618 | 2/1984 | Boward, Jr. et al. | 423/242 |
| 4,462,969 | 7/1984 | Wilhelm | 423/242 |
| 4,540,556 | 9/1985 | Wilhelm | 423/242 |

*Primary Examiner*—Gregory A. Heller
*Attorney, Agent, or Firm*—Christopher Egolf

[57] ABSTRACT

A method for improving utilization of limestone in a sodium-limestone double alkali flue gas desulfurization process. Spent alkaline absorber solution, containing sodium sulfite and sodium bisulfite, is diverted for regeneration treatment in a series of stirred tank reactors, where it is contacted with the limestone regenerating agent. Dilute slurry from the last reactor is concentrated in a thickener, and the concentrated underflow slurry from the thickener is then treated further in an after-reactor circuit. Since the thickener underflow slurry contains residual unreacted limestone, the slurry is contacted with a side stream of spent alkaline absorber solution in the after-reactor circuit to promote further reaction of residual limestone before the solids are separated and discarded.

21 Claims, 1 Drawing Figure

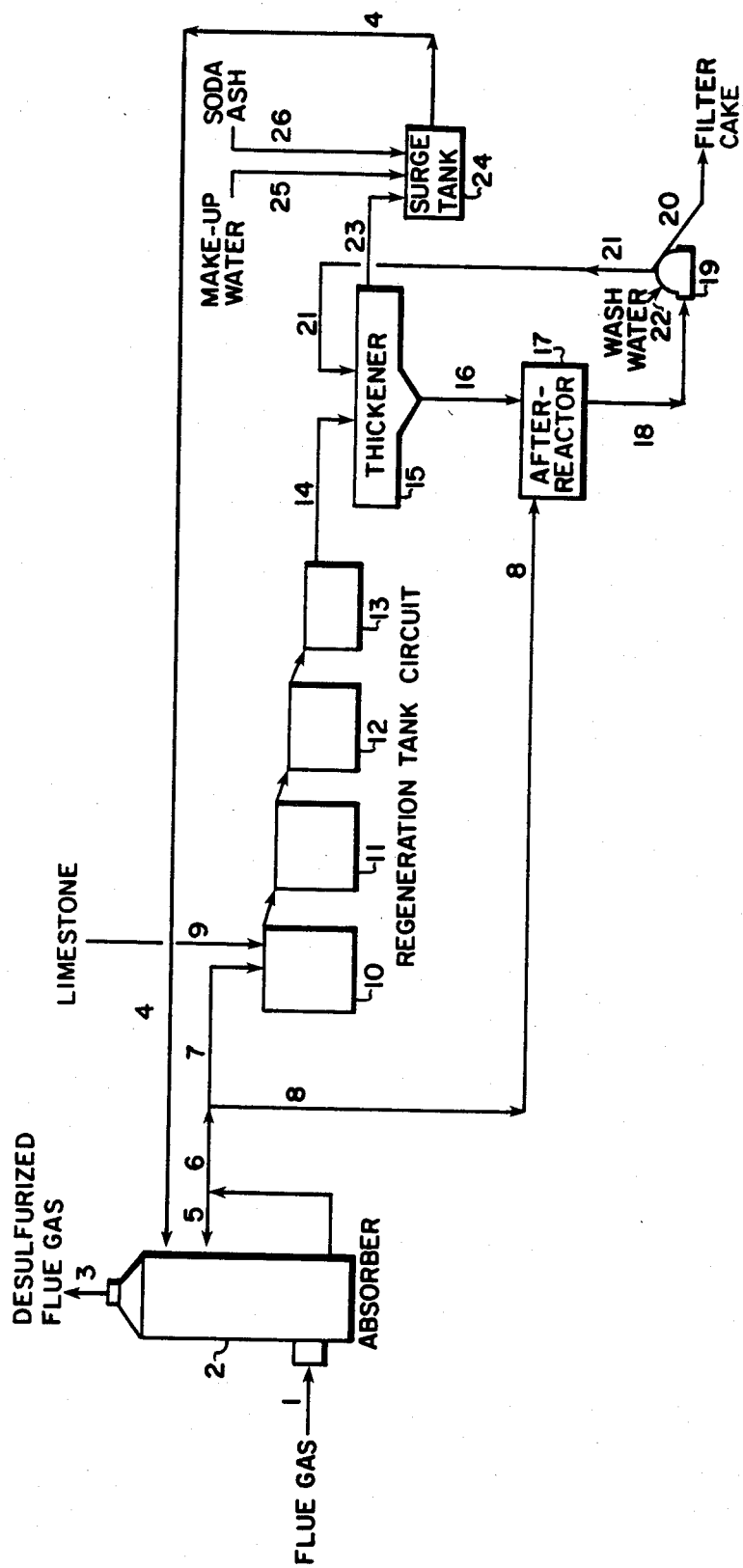

SODIUM-LIMESTONE DOUBLE ALKALI FLUE GAS DESULFURIZATION PROCESS WITH IMPROVED LIMESTONE UTILIZATION

BACKGROUND OF THE INVENTION

This invention relates to a flue gas desulfurization process that utilizes limestone to regenerate spent alkaline absorption solution containing sodium sulfite and sodium bisulfite.

Flue gas desulfurization processes that employ alkaline absorption solutions containing both sodium sulfite and sodium bisulfite for removing sulfur oxides like $SO_2$ from flue gases are well known and are normally operated continuously with the spent absorption solution being regenerated with lime or limestone. Such lime/limestone-sodium salt processes are often termed "double" or "dual" alkali processes in contradistinction to single alkali processes that directly treat the flue gas with lime or limestone.

Double alkali processes that utilize limestone as the regenerating agent are described in U.S. Pat. No. 4,410,500 issued to Wang et al., U.S. Pat. No. 4,431,618 issued to Boward et al., (which concerns process control methods); U.S. Pat. No. 3,848,070 issued to Onozuka et al., U.S. Pat. No. 3,944,649 issued to Field et al. and U.S. Pat. No. 3,989,796 issued to Morita et al.

The limestone regeneration is typically carried out as a continuous operation in a series of stirred tank reactors, with the limestone being contacted with spent absorber solution in the first tank. The regeneration tank circuit is usually operated with a relatively dilute concentration of solids, e.g., about 1–3 wt %, that is a mixture of calcium sulfite/sulfate and unreacted limestone.

One drawback to the use of limestone to regenerate sulfite from the bisulfite formed from absorbed sulfur dioxide is its low reactivity. As a consequence, relatively long residence times are needed in the regeneration tank circuit to achieve efficient limestone utilization, i.e., in excess of 90%.

The above-mentioned Wang et al. and Boward et al. patents employ less than a stoichiometric amount of limestone and therefore are vulnerable to factors that aggrevate limestone's low reactivity, such as coarse particle size of the ground limestone. Any appreciable reduction in the limestone's reactivity will require an unacceptably large volume of reactor capacity due to long residence times required in the regeneration procedure to achieve efficient limestone utilization. Various approaches are described in the prior art for coping with limestone's low reactivity.

The above-mentioned Onozuka et al., Field et al. and Morita et al. patents teach that at least a stoichiometric amount of limestone should be employed in the complete neutrilization of the bisulfite during regeneration. Although excess limestone increases the overall regeneration reaction rate, limestone utilization efficiency usually declines as a consequence, and this adversely affects the economics of the overall FGD process.

Modifications to the conventional stirred tank regeneration circuit are described in several patents as a means of improving the limestone regeneration operation.

U.S. Pat. No. 4,388,282 issued to Chou et al. employs hydroclones to separate coarse unreacted limestone particles from smaller calcium sulfite particles in the stirred tank reactor solids; the limestone particles are recycled for further reaction, to improve overall limestone utilization. Since this separation procedure relies on the existence of a size difference between the limestone particles and the calcium sulfite/sulfate regeneration by-product solids, it may not be effective with finely-ground limestone. This procedure is also complicated by the fact that the by-product solids sizing is influenced by the chemistry and mechanical design of the regeneration tank circuit.

Still another approach to this problem is described in U.S. Pat. No. 4,540,556 and No. 4,462,969 both issued to Wilhelm, which rely on the use of two reaction stages that contain a sludge layer or blanket with about 15–40% solids. While this procedure reduces the overall liquor residence time (and regeneration tank size) required, limestone utilization can still suffer because of the difficulty of providing adequate contact of the liquor with the settled solids blanket which contains unreacted limestone.

A simpler approach is described by Dauerman et al. in U.S. Pat. No. 4,261,962, which dispenses with a multiple tank regeneration circuit and teaches the use of a Y-shaped mixing nozzle to facilitate mixing and reaction of the limestone slurry with the absorber solution during regeneration. The patentees recommend use of a stoichiometric excess of limestone to maximize the advantages of their invention, but such increased limestone use inevitably reduces limestone utilization efficiency.

The present invention provides a simple means for achieving excellent limestone utilization, in excess of 90%, in a conventional stirred regeneration tank circuit, without resorting to use of specially-designed equipment.

SUMMARY OF THE INVENTION

The present invention is an improvement applicable to a sodium-limestone double alkali process for the continuous desulfurization of flue gas, having the steps of absorbing sulfur dioxide from an $SO_2$-containing gas stream in an absorber with an aqueous solution of sodium sulfite and sodium bisulfite, diverting at least a portion of the absorber effluent solution for regeneration with limestone, introducing limestone into the diverted absorber effluent solution to convert bisulfite to sulfite, separating by-product solids from the limestone-treated solution, and returning regenerated solution to the absorber.

In accordance with the present invention, the utilization of the limestone used during the regeneration operation is increased by the improvement which comprises (a) introducing a major portion of the absorber effluent solution diverted for limestone regeneration into a regeneration tank circuit;

(b) contacting the absorber effluent solution in the regeneration tank circuit with ground limestone, the level of solids in the regeneration tank circuit being maintained at a concentration below 5 wt % solids;

(c) removing a dilute slurry from the regeneration tank circuit, the slurry containing substantially regenerated solution, by-product calcium sulfite/sulfate solids, and incompletely-reacted ground limestone, and introducing the slurry to a thickener to concentrate the slurry solids content to at least twice the solids content of the regeneration tank circuit;

(d) returning regenerated solution obtained as overflow from the thickener to the absorber;

(e) transferring concentrated slurry obtained as thickener underflow to an after-reactor circuit, into which is also introduced the balance of absorber effluent solution diverted for regeneration, thereby facilitating further reaction of incompletely-reacted ground limestone in the concentrated slurry; and (f) removing slurry from the after-reactor and separating the substantially reacted solids from the liquor, the liquor being recycled to the thickener or to the regeneration tank circuit.

The proportion of diverted absorber effluent solution introduced to the regeneration tank circuit and to the after-reactor circuit is preferably adjusted to react about 70 to 80% of the limestone in the regeneration tank circuit, where the major portion of diverted absorber effluent solution is introduced. The balance of the limestone reaction then occurs in the after-reactor circuit, where the remainder of the diverted absorber effluent is introduced.

This proportioned split of diverted absorber effluent solution typically provides for about at least 70% utilization of limestone in the regeneration tank circuit. Residual limestone values still present in the slurry solids introduced to the after-reactor circuit are then reacted further, when contacted with absorber effluent solution there, so than an overall limestone utilization of 90–95%, and higher, is readily achieved in this invention.

BRIEF DESCRIPTION OF THE DRAWING

The drawing is a schematic flow diagram of a sodium-limestone double alkali flue gas desulfurization system, and it illustrates the regeneration operation being performed according to a preferred embodiment of the invention.

DETAILED DESCRIPTION

The improvement of this invention is applicable to conventional sodium-limestone double alkali flue gas desulfurization systems and provides a means for increasing the efficiency of the limestone utilized during the regeneration procedure of such systems. Details of a conventional sodium-limestone double alkali process, its various steps and process control, are adequately described in U.S. Pat. No. 4,410,500 issued to Wang et al. and U.S. Pat. No. 4,431,618 issued to Boward, Jr. et al., and for this reason these two U.S. patents are hereby incorporated by reference into this disclosure.

The present invention has the advantage of being readily adapted for use in a conventional sodium-limestone double alkali system. The primary process modification is the addition of an after-reactor circuit for the treatment of thickener solids underflow, to provide for more complete reaction of residual limestone in such solids.

The after-reactor circuit generally involves equipment of relatively modest capacity, as compared with the tank volume employed in the regeneration circuit, so additional equipment requirements for this modification are not large.

Use of the after-reactor circuit in combination with the conventional regeneration tank circuit and thickener results in a significant increase in residence time for the limestone in the regeneration procedure. This is accomplished, furthermore, without resorting to use of oversized capacity equipment in the regeneration tank circuit.

The after-reactor circuit of this invention provides a very efficient mechanism for improving limestone utilization in the overall regeneration operation, particularly when limestone utilization efficiency is below original design expectations. The regeneration reaction rate is heavily influenced by the reactivity of the limestone, and the after-reactor circuit readily compensates for the adverse impact of various factors (many being unpredictable) that can reduce limestone reactivity.

Limestone reactivity during the regeneration procedure in the regeneration tank circuit is lowered by the increase in pH that occurs inevitably as (acidic) bisulfite is converted to sulfite. Use of diverted absorber effluent solution in the after-reactor tank circuit, to contact residual unreacted limestone in the thickener underflow slurry, enhances limestone reactivity since such solution is more acidic (typically 5.5–6.7) than the regenerated solution in the thickener (typically 6.2–7.0).

The after-reactor circuit is, in this fashion, far more efficient at improving limestone utilization efficiency than the traditional approaches of increasing residence time either in the regeneration tank circuit (by adding more tanks) or in the thickener operation (by enlarging the thickener capacity). These latter approaches simply involve prolonged contact of the residual, unreacted limestone with an aqueous solution that is insufficiently acidic to promote efficient, more complete reaction of the limestone.

The efficiencies provided by the after-reactor circuit result from its providing the desired solids residence times with reduced working volume. This is due to the higher solids concentration and smaller amount of absorber effluent solution required for reaction with the residual unreacted limestone, as compared with traditional regeneration approaches.

It has also been discovered that the presence of various ionic species during the regeneration reaction is another factor that can reduce the reactivity of limestone. Significant concentrations of fluoride, ferrous, ferric, magnesium, and/or sulfate ions have been found to interfere with the regeneration reaction, when these ionic species accumulate in the recirculating absorber solution.

Because of these and other unpredictable factors, the original design bases for a sodium-limestone flue gas desulfurization system may not anticipate the actual (lowered) limestone reactivity encountered in an operational FGD system under all conditions. The process of this invention, however, permits a retrofit "correction" of design-deficient flue gas desulfurization systems, without costly modifications to the existing design. The after-reactor circuit of this invention is readily adapted to existing FGD systems, to effect a significant improvement in the limestone utilization efficiency, without need for a costly system redesign and rebuilding.

As is described in the referenced U.S. patents, the regeneration tank circuit may consist of a single tank, but, is typically a multistage tank circuit, preferably with at least two cascade-type, stirred tanks being connected in series. Two to four tanks in series is a preferred regeneration tank circuit arrangement.

The solids content of the slurry in the regeneration circuit tank is normally less than 5 wt % solids, and preferably is less than about 3 wt % solids. A slurry solids levels in the regeneration tank circuit of less than about 1 wt % solids is best avoided because extremely large tanks are needed to obtain the desired solids residence times.

The regeneration reaction that occurs in the regeneration circuit, i.e., converting bisulfite in the spent absorber effluent solution to sulfite, is accomplished by introducing ground limestone to the regeneration tanks. The ground limestone is normally added as an aqueous slurry, typically containing 20–40 wt % solids. Substantially all of the ground limestone, used as the regenerating agent, is desirably introduced into the initial tank of the regeneration tank circuit. Alternatively, the limestone may be apportioned between or among several stages, including the initial stage. The latter procedure is sometimes desirable in order to promote by-product crystal growth by controlling the reaction rate.

The amount of ground limestone introduced to the regeneration tank circuit is desirably less than stoichiometry, based on the theoretical calcium carbonate required to completely neutralize the bisulfite of all diverted absorber solution to sulfite.

Typical average solids residence time in the regeneration circuit is from 1 to 4 hours; 2 to 3 hours is preferred. A major portion of the absorber effluent solution that is diverted for regeneration with limestone is introduced into the initial stage, or stages, of the regeneration tank circuit. This major portion of diverted absorber effluent solution is desirably divided into a plurality of streams which are introduced into separate regeneration tanks, including the initial tank of the serially-arranged tank circuit. This procedure has the advantage of increasing the solids residence time, thus promoting increased limestone utilization.

The absorber effluent solution diverted for limestone regeneration desirably has a pH in the range of 5.5–6.7. The residence time in the regeneration tank should be sufficient to convert from about 20–70% of the solution bisulfite to sulfite and to increase the pH of the regenerated solution to a value within the range of 6.2–7.0.

A "major portion", as used in this disclosure, is more than half of the diverted solution, i.e., in excess of 50%. The portion, or proportion, of diverted absorber effluent solution introduced to the regeneration tank circuit is desirably adjusted so that at least about 65 to 90% of the limestone also introduced to the regeneration circuit is reacted while still in the regeneration tank circuit. The balance of the limestone reaction then occurs in the after-reactor circuit. Alternatively, the proportions of diverted absorber effluent solution introduced to the regeneration tank circuit and to the after-reactor circuit are adjusted to maintain a pH value in the after-reactor circuit within the range of 6.2–7.0.

A primary objective of this procedure is to provide for a substantial degree of limestone reaction in the regeneration tank circuit, in order to minimize the amount of unreacted limestone that is present in the thickener which concentrates the overflow solids from the regeneration circuit. Because the regeneration reaction with limestone results in the evolution of carbon dioxide gas, it is desirable to minimize the amount of reaction that continues to occur in the thickener. Evolution of large amounts of gas due to continued reaction of unreacted limestone in the thickener solids in counterproductive to the efficient settling of the thickener solids and clarification of the thickener overflow liquor.

The dilute slurry removed from the final stage of the regeneration tank circuit contains solids that contain by-product calcium sulfite/sulfate and incompletely-reacted limestone. The liquor is substantially regenerated solution, which is eventually returned to the absorber after separation of the solids from it.

The dilute slurry, containing less than 5 wt % solids and preferably less than 3 wt % solids but at least about 1 wt % solids, is introduced to a thickener to concentrate the slurry solids content to at least twice that of the dilute slurry from the regeneration tank circuit. The thickener is desirably operated to concentrate the solids in the slurry underflow to a solids level of at least 10 wt % solids. Desirably, the thickener is operated such that its slurry underflow is within the range of from 10 to 40 wt % solids.

The liquor overflow from the thickener, during its steady-state operation, is essentially solids-free and is suitable for return to the absorber as regenerated absorber solution. The thickener should be designed and operated to yield an overflow liquor that contains less than 500 ppm suspended solids; preferably the overflow liquor contains less than 300 ppm suspended solids.

As mentioned previously, a major portion of the absorber effluent solution is contacted with limestone in the regeneration tank circuit, in order to accomplish a substantial proportion of the regeneration reaction there.

Although unreacted limestone is present in the slurry solids being concentrated in the thickener, it is desirable that no more than a minimal amount of regeneration reaction be allowed to occur within the thickener, i.e., no more than 5–10% of the total limestone should become reacted while in the thickener. This additional limestone reaction in the thickener is readily controlled and kept to a minimum by adjusting the amount, i.e., the major portion, of diverted absorber effluent solution that is introduced to the regeneration tank circuit.

The underflow from the thickener is a concentrated slurry, which contains some residual unreacted limestone. In order to improve the overall utilization of the limestone, the process of this invention provides for the further reaction of incompletely-reacted ground limestone in these solids in an after-reactor circuit. The concentrated underflow slurry solids from the thickener are contacted with the balance of diverted absorber effluent solution in the after-reactor circuit.

A preferred embodiment of this invention calls for substantially all of the thickener underflow, in excess of about 50%, to be introduced to the after-reactor circuit. Alternatively, a minor proportion, from about 10 to 50%, of the thickener underflow slurry can be recycled to the regeneration tank circuit (to increase the overall residence time of the solids in the regeneration tank circuit), with the balance, from about 50 to 90%, of the underflow slurry being introduced to the after-reactor circuit.

The after-reactor circuit may consist of a single stirred tank or may consist of a plurality of tanks or tank stages connected in series. Tanks conventionally used for ensuring good mixing of solid particles with the liquid in concentrated aqueous slurries may be used in the after-reactor circuit; special design considerations are not required.

In the situation where the after-reactor circuit contains multiple stages, the absorber effluent solution being introduced into the after-reactor circuit may be divided into a plurality of streams which are introduced into separate tanks or tank stages, including the initial tank or stage of the serially-arranged after-reactor tank circuit. Preferably, all of the absorber effluent solution which is introduced to the after-reactor circuit is added to the initial stage.

The addition of the absorber effluent solution, to the concentrated slurry from the thickener serves to dilute the slurry. Despite this, the slurry is still relatively concentrated, and agitation is required in the after-reactor tanks to ensure good mixing.

Average residence times in the after-reactor circuit can range from 1 to 6 hours, with 2 to 5 hours being preferred and 2 to 4 being most preferred.

The preferred residence times are ordinarily sufficient to ensure that good, intimate mixing occurs between the particulate solids and the liquor, thus promoting the further reaction of unreacted limestone.

The additional spent absorber effluent solution typically has a more acidic pH than the liquor associated with the thickener underflow slurry introduced to the after-reactor circuit. The acidic pH of the introduced solution, as may be expected, assists in promoting the further neutralization reaction with unreacted limestone still present in the slurry solids.

For these reasons, the use of the after-reactor circuit as specified in this invention results in extremely good utilization efficiencies for the limestone regenerating agent, despite limestone's relatively low reactivity as compared with lime. Utilizations of 90 to 95%, and higher, are readily attained in the improved limestone double alkali process of this invention, using the after-reactor circuit as described.

After the reacted slurry is removed from the after-reactor circuit, the slurry is separated into a relatively solids-free liquor and substantially reacted solids. Filtration is preferred for this separation, but other solids-liquid separation techniques, like centrifugation, can be also used.

The separated solids are ordinarily discarded, but may also be processed or treated further to recover their calcium sulfite/sulfate values. The recovered liquor is recycled, preferably to the thickener, but alternatively the recovered liquor may be recycled further upstream, to the regeneration tank circuit. The former procedure is preferred because the thickener is usually more conveniently located near the after-reactor tank circuit.

While all of the after-reactor slurry is usually processed as described to separate its liquor and solids components, it is also possible to recycle a portion of the unseparated slurry back to the thickener. This procedure has the effect of increasing the residence time of the solids, so as to provide an even longer exposure of unreacted limestone to further reaction with bisulfite in the liquor. Furthermore, this procedure may often be accomplished via natural overflow from the after-reactor circuit to the thickener, thus avoiding the need for costly control equipment.

Preferred embodiments of the invention are described above and in the Example which follows. It should be apparent, however, that other process configurations can be devised which nevertheless still incorporate the essential elements of this invention. Such process variations could include, for example, multiple regeneration tank circuits, multiple thickeners, or multiple after-reactor circuits, and are intended to be included within the scope of this invention.

EXAMPLE

The Example illustrates the application of a preferred embodiment of the present invention to the desulfurization of flue gas from a large boiler utilizing high sulfur coal.

The process of the Example is operated continuously, and normal steady state conditions are assumed for purposes of the Example. The drawing illustrates a schematic flow diagram of this preferred embodiment; reference numerals in the drawing are included in the process description which follows.

In the absorption section, flue gas 1 from the boiler is introduced at a rate of about 589,000 acfm (288 m$^3$/sec) and at a temperature of 280° F. (138° C.) in a counter-current flow spray tower absorber 2 which has three stages. In the absorber 2, sulfur dioxide is absorbed into aqueous solution containing both sodium sulfite and sodium bisulfite, and the treated flue gas 3 which exits from the absorber has substantially all (in excess of 90%) sulfur dioxide removed. The treated flue gas 3 exits at a rate of about 492,000 acfm (232 m$^3$/sec) and at a temperature of 129° F. (54° C.). Before being vented, the desulfurized flue gas stream 3 is passed through a mist eliminator (not shown) to remove entrained absorber solution from the gas stream.

Regenerated absorber solution 4 is introduced continuously at the top stage of the absorber tower, at a constant rate of about 3,000 gpm (189 liters/sec). The regenerated absorber solution 4 has a pH of about 6.6.

Aqueous solution which accumulates in the absorber tower sump is removed and split into two streams, the first stream 5 being recycled to the absorber tower 2 and the second stream 6 being diverted to the limestone regeneration section of the process.

The recycled stream 5 is introduced into the absorber 2 at the middle and lower stages, below the introduction point for the regenerated absorber solution 4, and is thus recontacted with the flue gas passing upwards through the tower. Recycled absorber solution 5 is recirculated at a rate of about 12,400 gpm (782 liters/sec).

The remaining portion of absorber solution removed from the absorber tower bottom is diverted as stream 6 and is divided into two portions, a major portion 7 and a minor portion 8. The major portion, stream 7, is subjected to regeneration with limestone 9 in the regeneration tank circuit section, as described below. The effluent solution 7 is diverted at a constant flow rate of about 2300 gpm (145 liters/sec) to the regeneration tank circuit.

The pH of the absorber solution removed from the absorber (for recirculation and for regeneration) is about 6.2 at full load. It should be understood that this pH value will increase, within the range of about 6.2 to 6.6, when load conditions decrease as during dynamic turndown when a reduced volume of flue gas is being treated. This pH increase occurs because the amount of effluent solution 6 being diverted remains constant. In an alternative process control scheme, the effluent absorber solution pH value could be kept constant by varying the flow rate of absorber effluent solution diverted for regeneration, as necessary.

The diverted major portion of absorber solution 7, rich in sodium bisulfite, is regenerated with limestone 9 in a regeneration tank circuit. The regeneration tank circuit has four stages 10, 11, 12, 13, which are CSTR cascade tanks linked in series, in which overflow slurry from the first stage 10 is introduced by gravity into the second stage 11, and so forth for the remaining stages 12 and 13. Each of the four stages has a working volume of about 135,000 gallons, and each is equipped with an agitator to assure good mixing.

Limestone for use in this regeneration is prepared by wet ball milling of limestone lumps to recover ground limestone that is substantially all less than 325 Sieve (45 μm) in size and typically analyzes as 90% by weight $CaCO_3$. The ground limestone 9 is introduced as an aqueous slurry, containing about 25% by weight solids, and is introduced into the initial regeneration tank stage 10.

The ground limestone slurry 9 is introduced at an overall rate of about 120 gpm (8 liters/sec). The precise introduction rate is adjusted via a control system which maintains the pH of the regenerated absorber solution 4 at the desired pH of 6.6.

Residence time of the diverted absorber effluent solution 7 in the four regeneration tank stages 10, 11, 12, 13 is about 220 minutes, each regeneration tank stage having a residence time of about 55 minutes.

The solids concentration in the last stage 13 is about 1.2% by weight. The overflow slurry 14 from the last stage 13 is passed by gravity flow to a thickener 15 for liquid-solid separation. The thickener 15 is operated such that its underflow 16 is a concentrated slurry containing about 20% by weight solids.

The concentrated underflow slurry 16 is removed from the thickener 15 at a rate of about 144 gpm (9 liters/sec). The thickener underflow slurry 16 is introduced into the after-reactor circuit, consisting of a single stirred tank 17 having a working volume of 135,000 gallons (the same as a single regeneration circuit tank).

The minor portion of diverted absorber effluent solution 8 is added to the after-reactor 17 at a flow rate of about 576 gpm (36 liters/sec). Residence time of the slurry solids in the after-reactor circuit 17 is about 190 minutes.

Treated slurry 18 is withdrawn from the after-reactor 17 and is introduced into a rotary vacuum filter 19, which produces a dewatered filter cake 20 and a mother liquor 21. The filter cake, is washed with water 22 (used at a rate of 35 gpm (2 liters/sec)), to yield a dewatered cake 20 which is about 50 to 75% by weight solids that are predominantly calcium sulfite; the cake 20 is discarded. The mother liquor 21, which also contains the wash water 22 used to wash the filter cake, is returned to the thickener 15 for further clarification.

Overflow solution 23 from the thickener 15 contains about 100 ppm solids and contains the following ionic species as impurities: 130 ppm $F^-$; 485 ppm $Mg^{++}$; 4.1 ppm $Fe^{++}$; and 5000 ppm $Cl^-$. The thickener overflow solution 23 is transferred to a surge tank 24.

Make-up water 25 and soda ash 26, preferably a 30 wt % $Na_2CO_3$ solution, are introduced to the surge tank 24 to compensate for sodium losses in the filter cake 20 and to serve as absorber solution make up. The proper sodium level in the absorber solution, i.e., its active sodium concentration, and water balance in the absorption system is best controlled by the introduction of soda ash and water at this point. The active sodium in the regenerated absorber solution is preferably maintained at a concentration of about 0.9 M. It should be noted that the amounts of make-up water 25 and soda ash 26 are relatively small and thus have a minimal effect on the pH of the thickener overflow solution 23 into which they are introduced.

Aqueous solution 4 from the surge tank is a sodium sulfite-rich solution whose pH is about 6.6. This pH is maintained via the limestone feed addition to reactor stage 10. This solution 4 is returned to the absorber 2, via pumping, as regenerated absorber solution 4.

The decrease in bisulfite concentration, after the diverted absorber effluent solution 6 has been subjected to limestone regeneration and is ready for return to the absorber as regenerated solution 4, is about 0.21 M. The percentage of sodium bisulfite in the absorber effluent solution 6 that is converted to sulfite by the limestone treatment is about 40%.

The limestone utilization in the process as described above is in excess of 95%, thus providing for a highly efficient operation. This outstanding limestone utilization is obtained notwithstanding the presence of detrimental ionic species in the recirculating absorber solution. Without the after-reactor circuit of this invention the flue gas desulfurization process described in this Example would ordinarily exhibit a limestone utilization efficiency well below 90%.

We claim:

1. In a sodium-limestone double alkali process for the continuous desulfurization of flue gas, having the steps of absorbing sulfur dioxide from an $SO_2$-containing gas stream in an absorber with an aqueous solution of sodium sulfite and sodium bisulfite, diverting at least a portion of the absorber effluent solution for regeneration with limestone, introducing limestone into the diverted absorber effluent solution to convert bisulfite to sulfite, separating by-product solids from the limestone-treated solution, and returning regenerated solution to the absorber, the improvement for increasing the utilization of the limestone used during the regeneration operation which comprises (a) introducing a major portion of the absorber effluent solution diverted for limestone regeneration into a regeneration tank circuit;

(b) contacting the absorber effluent solution in the regeneration tank circuit with ground limestone, the level of solids in the regeneration tank circuit being maintained at a concentraion below 5 wt % solids;

(c) removing a dilute slurry from the regeneration tank circuit, the slurry containing substantially regenerated solution, by-product calcium sulfite/sulfate solids, and incompletely-reacted ground limestone, and introducing the slurry to a thickener to concentrate the slurry solids content to at least twice the solids content of the regeneration tank circuit;

(d) returning regenerated solution obtained as overflow from the thickener to the absorber;

(e) transferring concentrated slurry obtained as thickener underflow to an after-reactor circuit, into which is also introduced the balance of absorber effluent solution diverted for regeneration, thereby facilitating further reaction of incompletely-reacted ground limestone in the concentrated slurry; and (f) removing slurry from the after-reactor circuit and separating the substantially reacted solids from the liquor, the liquor being recycled to the thickener or to the regeneration tank circuit.

2. In a sodium-limestone double alkali process for the continuous desulfurization of flue gas, having the steps of absorbing sulfur dioxide from an $SO_2$-containing gas stream in an absorber with an aqueous solution of sodium sulfite and sodium bisulfite, diverting at least a portion of the absorber effluent solution for regeneration with limestone, introducing limestone into the diverted absorber effluent solution to convert bisulfite to sulfite, separating by-product solids from the limestone-treated solution, and returning regenerated solution to the absorber, the improvement for increasing the utilization of the limestone used during the regeneration operation which comprises (a) introducing a major portion of the absorber effluent solution diverted for limestone regeneration, such diverted absorber effluent solution having a pH in the range of 5.5–6.7, into a regeneration tank circuit;

(b) contacting the absorber effluent solution in the regeneration tank circuit with ground limestone, the level of solids in the regeneration tank circuit being maintained at a concentration below 5 wt % solids and the amount of limestone being less than stoichiometry based on the theoretical calcium carbonate required to completely neutralize the bisulfite of all diverted absorber solution to sulfite;

(c) providing sufficient residence time in the regeneration tank circuit to convert from about 20–70% of the solution bisulfite to sulfite and to increase the pH of the regenerated solution to a value within the range of 6.2–7.0;

(d) removing a dilute slurry from the regeneration tank circuit, the slurry containing substantially regenerated solution, by-product calcium sulfite/sulfate solids, and incompletely-reacted ground limestone, and introducing the slurry to a thickener to concentrate the slurry solids content to at least twice the solids content of the regeneration tank circuit;

(e) returning regenerated solution obtained as overflow from the thickener to the absorber;

(f) transferring concentrated slurry obtained as thickener underflow to an after-reactor circuit, into which is also introduced the balance of absorber effluent solution diverted for regeneration, thereby facilitating further reaction of incompletely-reacted ground limestone in the concentrated slurry; and (g) removing slurry from the after-reactor and separating the substantially reacted solids from the liquor, the liquor being recycled to the thickener or to the regeneration tank circuit.

3. The process of claim 1 or 2 wherein the regeneration tank circuit consists of at least two regeneration tanks connected in series.

4. The process of claim 3 wherein the major portion of absorber effluent solution diverted for regeneration in the regeneration tank circuit is divided into a plurality of streams which are introduced into separate regeneration tanks, including the initial tank of the serially-arranged tank cicuit.

5. The process of claim 3 wherein substantially all of the ground limestone is introduced into the initial tank of the regeneration tank ciruit.

6. The process of claim 1 or 2 wherein the concentration of solids in the regeneration tank circuit is maintained at less than about 3 wt % solids.

7. The process of claim 1 or 2 wherein the average residence time in the regeneration tank circuit is from about 1 to 4 hours.

8. The process of claim 1 or 2 wherein the thickener is operated to concentrate the underflow slurry to a solids level of at least 10 to wt % solids.

9. The process of claim 1 or 2 wherein the thickener is operated to concentrate the underflow slurry to a solids level within the range of 10–40 wt % solids.

10. The process of claim 1 or 2 wherein substantially all of the thickener underflow is introduced to the after-reactor circuit.

11. The process of claim 1 or 2 wherein from 50 to 90% of the thickener underflow is introduced to the after-reactor circuit, the balance being recycled to the regeneration tank circuit.

12. The process of claim 1 or 2 wherein the after-reactor circuit consists of a single after-reactor tank.

13. The process of claim 1 or 2 wherein the after-reactor circuit consists of a plurality of after-reactor tanks or stages connected in series.

14. The process of claim 13 wherein the absorber effluent solution being introduced into the after-reactor circuit is divided into a plurality of streams which are introduced into separate after-reactor tanks, including the initial tank of the serially-arranged tank circuit.

15. The process of claim 1 or 2 wherein the average residence time in the after-reactor circuit is from 1 to 6 hours.

16. The process of claim 1 or 2 wherein a portion of the slurry removed from the after-reactor circuit is recycled to the thickener, without separation of the slurry's liquor and solids.

17. The process of claim 1 or 2 wherein the slurry removed from the after-reactor is separated into its solid and liquor components by filtration or centrifugation.

18. The process of claim 17 wherein liquor, which is recovered from the removed after-reactor slurry, is recycled to the thickener.

19. The process of claim 17 wherein liquor, which is recovered from the removed after-reactor slurry, is recycled to the regeneration tank circuit.

20. The process of claim 1 or 2 wherein the proportions of diverted absorber effluent solution introduced to the regeneration tank circuit and to the after-reactor circuit are adjusted to react about 65 to 95% of the limestone that is also introduced to the regeneration tank circuit.

21. The process of claim 1 or 2 wherein the proportions of diverted absorbor effluent solution introduced to the regeneration tank circuit and to the after-reactor circuit are adjusted to maintain a pH value in the after-reactor circuit within the range of 6.2–7.0.

* * * * *